United States Patent [19]
Calvignac et al.

[11] Patent Number: 5,251,206
[45] Date of Patent: Oct. 5, 1993

[54] HYBRID SWITCHING SYSTEM FOR A COMMUNICATION NODE

[75] Inventors: Jean Calvignac; Eric Saint Georges, both of La Gaude; Daniel Orsatti, Cagnes sur Mer; Gilles Toubol, Villeneuve Loubet; Fabrice Verplanken, Le Haute de Cagnes; Francois Nicolas, Villeneuve Loubet, all of France

[73] Assignee: International Business Machines Corp., Armonk, N.Y.

[21] Appl. No.: 684,111

[22] Filed: Apr. 12, 1991

[30] Foreign Application Priority Data

May 15, 1990 [EP] European Pat. Off. ........ 90480069.5

[51] Int. Cl.⁵ ...................... H04L 12/56; H04L 12/50
[52] U.S. Cl. ................................................. 370/60.1
[58] Field of Search ................. 370/60, 60.1, 94.1, 370/94.2, 58.1, 58.2, 58.3

[56] References Cited

U.S. PATENT DOCUMENTS

| | | | |
|---|---|---|---|
| 4,413,337 | 11/1983 | Dauphin et al. | 370/60.1 |
| 4,862,451 | 8/1989 | Closs et al. | 370/60.1 |
| 4,975,695 | 12/1990 | Almond et al. | 370/60.1 |

FOREIGN PATENT DOCUMENTS

| | | |
|---|---|---|
| 0232437 | 8/1987 | European Pat. Off. . |
| 0366935 | 5/1990 | European Pat. Off. . |
| 3814015 | 11/1989 | Fed. Rep. of Germany . |

OTHER PUBLICATIONS

Ninth International Conference on Computer Communication, Nov. 1988, North-Holland Amsterdam(NL), pp. 61-65; F. Barnabei et al, "A Hybrid Switching Exchange for Broadband Communications".

*Primary Examiner*—Wellington Chin
*Attorney, Agent, or Firm*—Edward H. Duffield

[57] ABSTRACT

The hybrid packet and circuit switching system allows merging of packet and circuit traffic from user interface modules on a TDM bus and transfer of packet information from one module to another module or the exchange circuit information between modules. Circuit exchanges or packet transfers are performed synchronously on the TDM busses in bursts of period T, with each burst comprising a fixed number of bytes. The bursts are switched by switch 1. A routing indication common to the packet and circuit bursts is used for controlling the switching of the bursts by the switch 1. The indication is performed by piggy backing the target module address for the circuit bursts, as well as for the packet burst, with the data bursts. Marking tables needed for the circuit burst allocation are located in the user interface modules.

11 Claims, 13 Drawing Sheets

BIT POSITIONS b0 TO b63

CONTROL UP EVEN

| | 0 2 4 6 8 | 1 0 | 1 2 | 1 4 | 1 6 | 1 8 | 2 0 | 2 2 | 2 4 | 2 6 | 2 8 | 3 0 | 3 2 | 3 4 | 3 6 | 3 8 | 4 0 | 4 2 | 4 4 | 4 6 | 4 8 | 5 0 | 5 2 | 5 4 | 5 6 | 5 8 | 6 0 | 6 2 |
|---|---|---|---|---|---|---|---|---|---|---|---|---|---|---|---|---|---|---|---|---|---|---|---|---|---|---|---|---|

| PRDA | SC/BRRC | P B | 0 0 0 0 0 | EXTENDED PBC | 0 0 0 0 0 0 0 | 0 P | PTY0 |

FIG. 8A

CONTROL UP ODD

| 1 3 5 7 9 | 1 1 | 1 3 | 1 5 | 1 7 | 1 9 | 2 1 | 2 3 | 2 5 | 2 7 | 2 9 | 3 1 | 3 3 | 3 5 | 3 7 | 3 9 | 4 1 | 4 3 | 4 5 | 4 7 | 4 9 | 5 1 | 5 3 | 5 5 | 5 7 | 5 9 | 6 1 | 6 3 |

| 0 | CTDA1 | P 0 | PTY1 | P 0 | CTDA2 | P 0 | PTY2 | P 0 | CTDA3 | P 0 | PTY3 | P 0 | CTDA4 | P | PTY4 |

FIG. 8B

CONTROL DOWN

| 0 2 4 6 8 | 1 0 | 1 2 | 1 4 | 1 6 | 1 8 | 2 0 | 2 2 | 2 4 | 2 6 | 2 8 | 3 0 | 3 2 | 3 4 | 3 6 | 3 8 | 4 0 | 4 2 | 4 4 | 4 6 | 4 8 | 5 0 | 5 2 | 5 4 | 5 6 | 5 8 | 6 0 | 6 2 |

| NTDA | 0 CBBGC | P | 0 0 0 0 0 0 | EXTENDED PBC | 0 0 0 0 0 N 0 D A | 0 P | PTY5 |

← ONE BURST TIME ON TDM BUS 4 →   TIME →

FIG. 8C

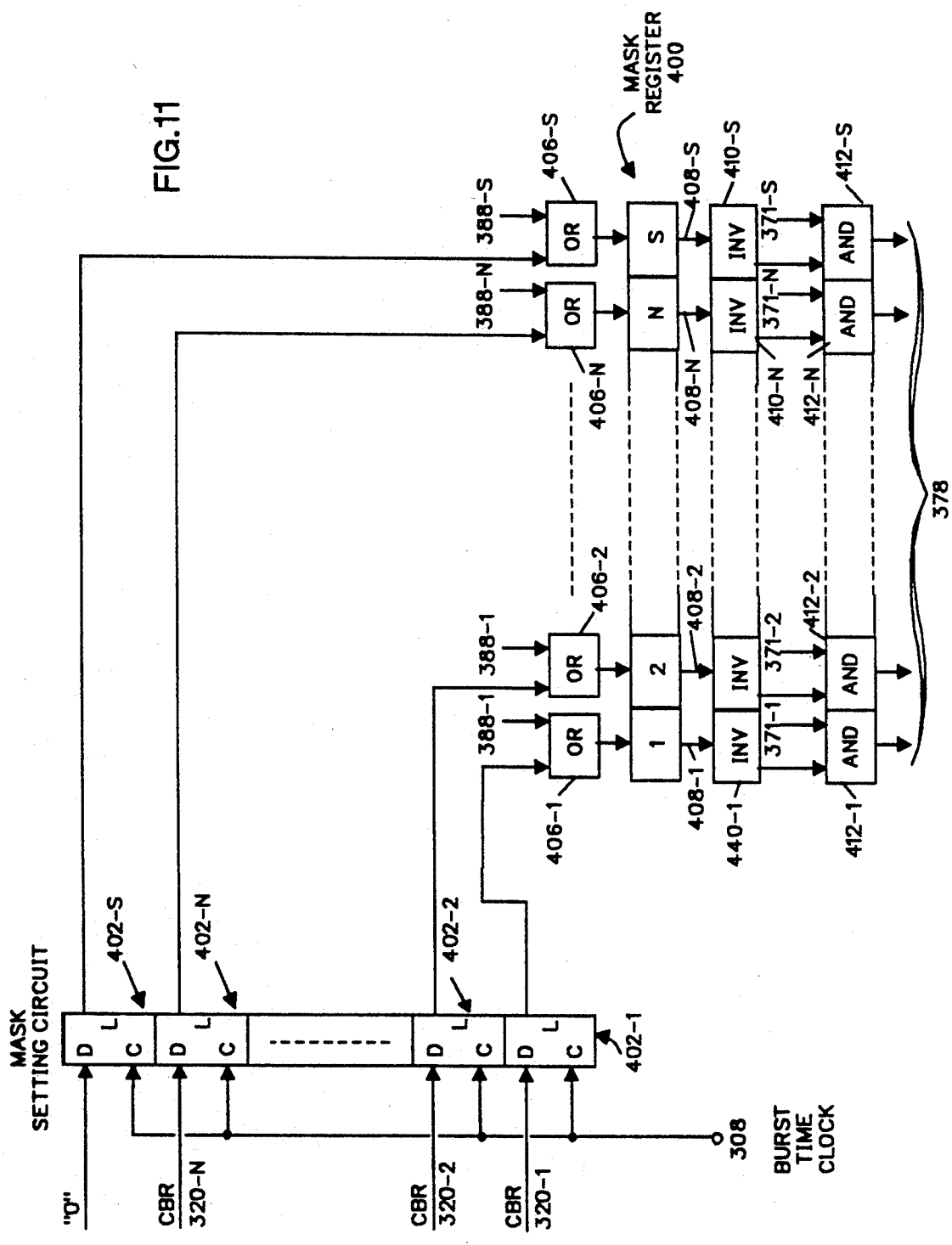

HYBRID SWITCHING SYSTEM FOR A COMMUNICATION NODE

DESCRIPTION OF THE INVENTION

The present invention relates to an hybrid switching system which allows traffics of the packet and circuit types to be mixed and exchanged or transferred between a plurality of adapters or user interface modules in a communication node.

BACKGROUND OF THE INVENTION

The subject invention is to be implemented in a high availability communication node comprising several adapters to be interconnected so that they can exchange or transfer information of the circuit or packet type.

In such an environment several solutions exist to perform this function.

One conventional solution consists in providing two dedicated busses linking the adapters, one being devoted to the circuit type exchanges and the other one being devoted to the packet type transfers. This solution leads to a complicated bus structure when implemented in a high availability environment requiring the duplication of all control and bus resources.

Another solution consists in providing a multipoint parallel bus to which the adapters are connected and in mixing the packet and circuit type information thereon. This solution leads to a large number of input/output interfaces which makes the hot plugging of the adapters difficult.

OBJECTS OF THE INVENTION

An object of the present invention is to provide an improved hybrid switching system allowing circuit type information to be exchanged between user interface modules in a communication node or for packet type information to be transferred between said modules.

Another object of the present invention is to provide an improved hybrid switching system which allows the bandwidth to be split dynamically between circuit and packet traffic.

Another object of the present invention is to provide an improved hybrid switching system which insures that the circuit type exchanges between user interface modules have priority over the packet transfers between these modules and makes use of the same routing indications for circuit exchanges and packet transfers.

BRIEF SUMMARY

The hybrid packet and circuit switching system for a communication node according to the subject invention comprises a switching arrangement for establishing connections between user interface modules, each module being connected to the switching arrangement through an input bus and an output bus. It comprises at least a packet information processing unit and, optionally, a circuit information processing unit. The switching arrangement is able to selectively connect input busses to output busses in order to allow transfers of packet or circuit information to be performed between user interface modules in frames of time period T, divided in a fixed number b of bursts times, Bj, with j lying in the range between 0 and b-1, said burst times being comprised of slots td, with each slot being able to carry circuit or packet information bytes.

The switching system comprises the following major elements:

A selection device located in the switching arrangement, which is responsive to packet transfer requests received from the packet information processing units in the user interface modules through the input busses to select during each burst time Bj, pairs of user interface modules comprising an origin module and a target module between which packet information will be transferred during a next burst time $B(j+p)$, p being an integer number equal to or higher than 1; and An inhibiting device which is responsive to circuit transfer requests received from the circuit information processing units in the user interface modules through the input busses during a burst time $B(j-q)$, q being an integer number equal to or higher than 1, to prevent the modules from which the circuit transfer requests are received, from being selected by the selection device as origin and target modules for packet transfers; and Circuit information transfer enabling arrangements in each circuit information processing unit which causes circuit information to be transferred from the circuit information processing unit within an origin module to the circuit information processing unit within a target module during the burst time $B(j+p)$ when said circuit information processing unit within the origin module has sent a circuit transfer request during burst time $B(j-q)$.

BRIEF DESCRIPTION OF THE DRAWING

FIG. 8-A, FIG. 8-B and FIG. 8-C represent the bit mapping on the CONTROL UP, CONTROL EVEN and CONTROL DOWN lines of FIG. 7.

FIG. 11 represents the masking circuit 376 of FIG. 10.

DETAILED DESCRIPTION OF THE PREFERRED EMBODIMENT

Figure 1:
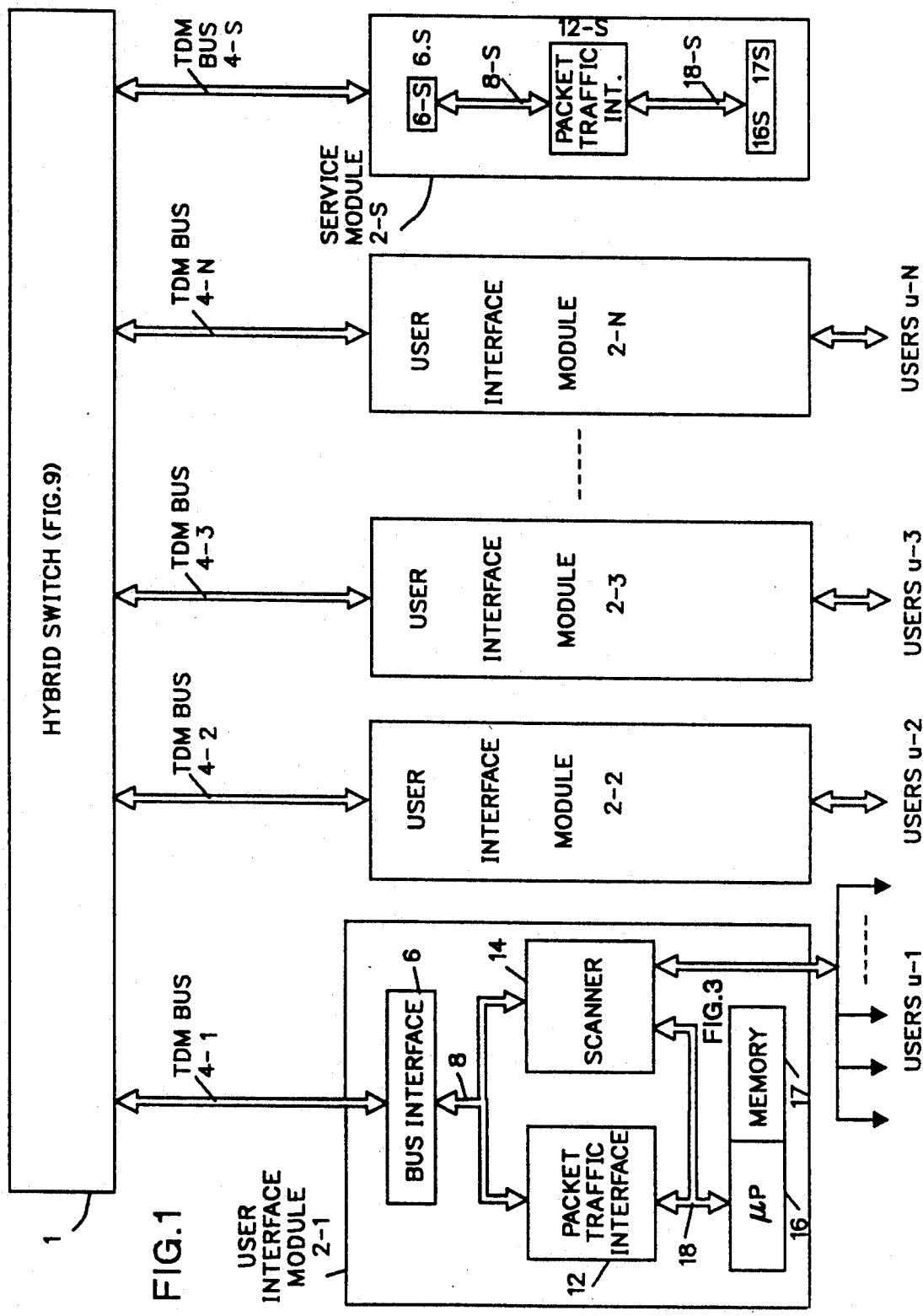
FIG. 1 represents the block diagram of a communication node wherein the hybrid switching system according to the subject invention can be implemented.

FIG. 1 schematically represents a communication node incorporating an hybrid switching mechanism according to the subject invention.

The function of the hybrid system mechanism is to interconnect users so that they can exchange information of the circuit type or transfer information of the packet type. An exchange of information implies a transfer of information in both directions between two users. The users are connected to user interface modules 2-1, 2-2 to 2-N. Each module arranges the information to be transferred through hybrid switch 1 on time division multiplex busses 4-1 to 4-N. Each module can be connected to a plurality of users U, which are schematically shown in FIG. 1 where users U-1, U-2, U-3 and U-N are connected to modules 2-1, 2-2, 2-3 and 2-N, respectively.

In FIG. 1, only the components in user interface module 2-1 are shown since all the modules are identical.

The user interface modules comprise a bus interface 6, which allows the different types of information from bus 8 to be provided to or received from the TDM bus 4-1.

Bus 8 is the input/output bus for a packet traffic interface 12 and for a scanner 14 which is attached to users U-1.

The packet traffic interface is a packet information processing unit and the scanner 14 is primarily a circuit information processing unit.

The user interface module also comprises a microprocessor 16 running a program stored in its memory 17. The scanner 14 and the microprocessor 16 are attached to the packet traffic interface 12 which processes all the packet traffic from/to the users U-1 and from/to the microprocessor 16.

In a preferred embodiment of the invention, the scanner 14 is connected to the users U-1 through a serial link able to transport frames having a time duration period of $T = 125$ microseconds. In the successive frames a number of data slots $t_\_$ is assigned to each user depending upon their data rates. Only one data slot is assigned to the users whose data rate is lower or equal to 64 kilobits per second, two data slots are assigned to users whose data rates are lower or equal to 128 kilobits per second (but greater than 64 kilobits per second), etc.

The frames contain a maximum number of 128 data slots so that the number of users which can be attached is equal to 128 users operating at 64 kilobits per second.

The users are able to transmit or receive packet type information or circuit type information in their assigned data slots.

In addition, the communication node may comprise a service module 2-S which only includes the components required for processing the packet traffic. These components are referenced with the same reference numbers, but with a suffix S.

Figure 2:
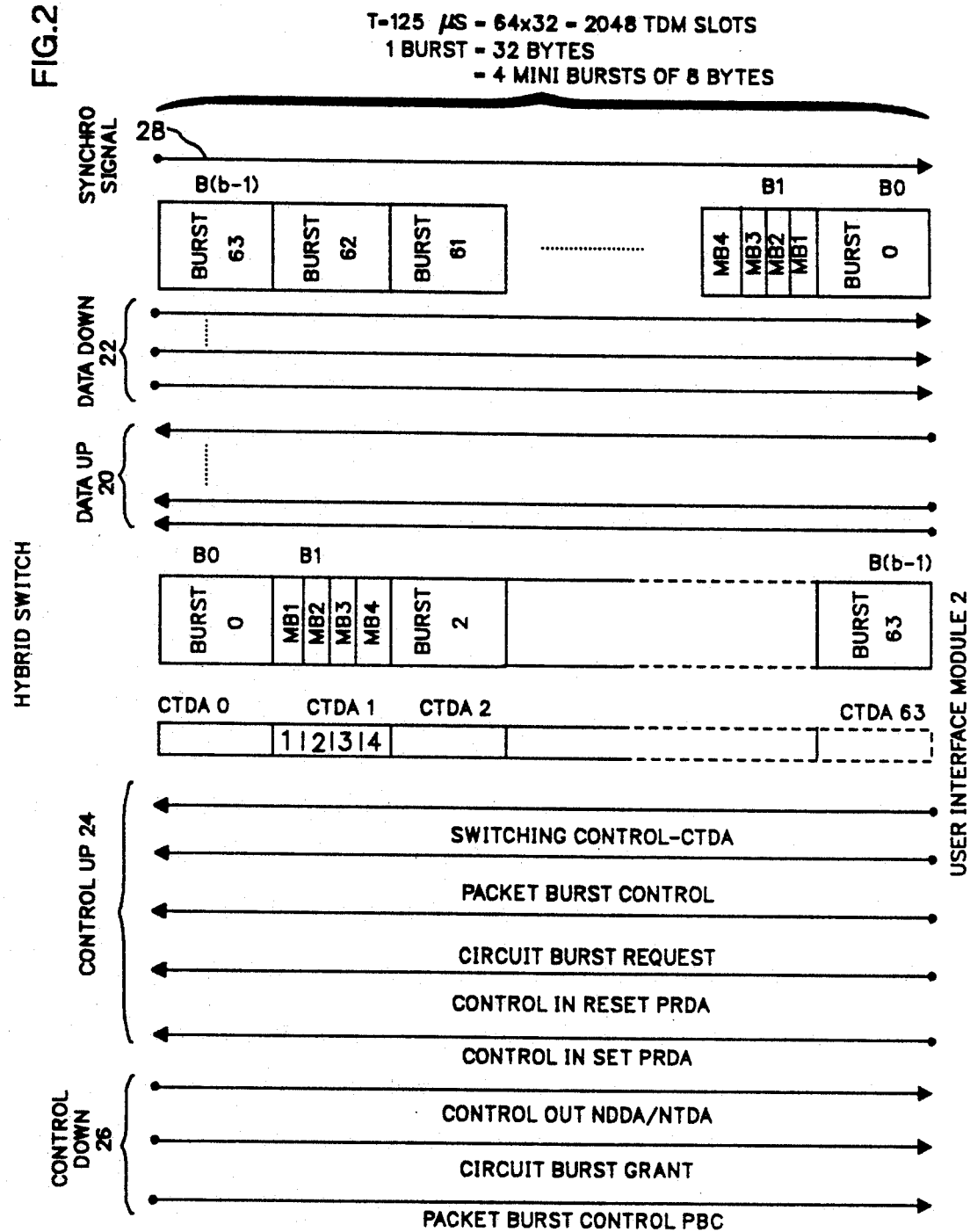
FIG. 2 represents the logical interface between the user interface modules 2-i and the hybrid switch 1.

FIG. 2 represents the logical TDM bus interface 4. The transfers through the hybrid switch 1 are performed in bursts. As shown in FIG. 2, there are a given number b of bursts numbered B0 to B(b-1) in a period T. This number depends upon the specific application of the invention. In the preferred embodiment of the invention, b is equal to 64 and each burst comprises 32 bytes. The data bursts are provided by means of "data up" lines 20 from a user interface module 2 to the hybrid switch 1 and by means of "data down" lines 22 from the hybrid switch 1 to a user interface module 2.

The switching operation in the switch 1 is controlled in accordance with "control up" information 24 which comprises:

SET Packet Request Device Address, (SET PRDA) which is activated by the user interface module to the hybrid switch in order to enable the switch to schedule the requested packet transfer.

RESET Packet Request Device Address, (RESET PRDA) which is activated by the user interface module at the end of the transfer.

Packet Burst Control PBC which contains information qualifying the data burst sent through the data up lines, such as First burst of message
Last burst of message
Bytes count when the burst contains less than 32 bytes.

Circuit Burst Request CBR which is activated by the scanner to request a circuit burst transfer.

Configuration Target Device Address CTDA which holds the destination of the burst. It is sent by the user interface module to the hybrid switch which is responsive to the CTDA information associated to each burst to route the burst.

The hybrid switch 1 provides "control down" information 26 to the user interface module, this information comprises:

Next origin device address/Next target device address NODA/NTDA, which is generated by the hybrid switch. NODA indicates from which module, a next data burst on the data down lines will be received and NTDA indicates the module to which a next data burst on the data up lines is to be provided. The NTDA information is used to generate the CTDA information for a packet burst. The CTDA information for a circuit burst originates from the scanner.

Circuit Burst Grant CBG, which is provided by the hybrid switch to control a circuit burst transfer.

Packet Burst Control PCB, which contains information qualifying a packet burst on "data down" lines.

In a preferred embodiment of the present invention, the "control up" information is multiplexed on a single wire and the "control down" information is also multiplexed on a single wire in order to simplify the physical interface.

In addition, a circuit burst, for example burst B1 as shown in FIG. 2, can comprise four mini-bursts MB1, MB2, MB3, MB4 associated with four different target modules indicated by four distinct Configuration Target Device Addresses CTDA associated with each mini burst.

Also, the hybrid switch provides synchronization information 28.

Figure 3:
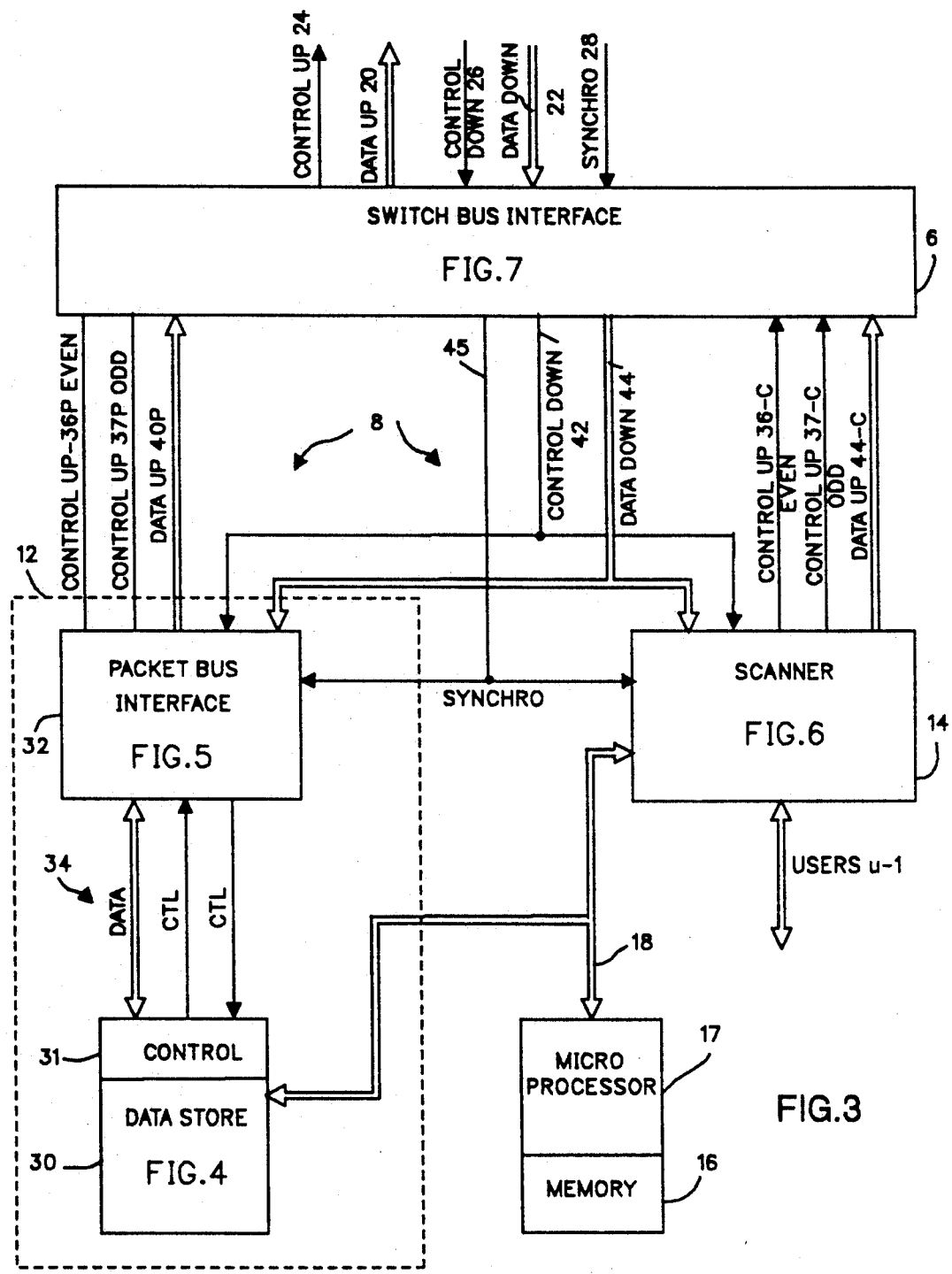
FIG. 3 represents the block diagram of a user interface module.

FIG. 3 shows the block diagram of a user interface module 2 and also indicates which figures represent the different blocks in greater detail.

The packet traffic interface comprises a data store 30 into which the packet messages to be transferred are buffered, as will be described in reference to FIG. 4. This data store 30 is connected to a packet bus interface 32 through bus 34 and data store control circuit 31.

The packet bus interface 32 will be described in reference to FIG. 5.

Packet bus interface 32 is connected to switch bus interface 6 through bus 8. Bus 8 comprises CONTROL UP EVEN and ODD lines 36-P and 37-P and DATA UP bus 40-P, where P stands for "Packet". Switch bus interface 6 provides CONTROL DOWN information on line 42 which is provided to packet bus interface 32 and to scanner 14 to dispatch each burst received on DATA DOWN bus 44. The scanner provides the circuit type burst on DATA UP lines 44-C and control information on CONTROL UP EVEN and ODD lines 36-C and 37-C, where C stands for "Circuit".

Also, bus 8 comprises a synchronization line 45 which is provided to packet bus interface 32 and scanner 14.

Switch bus interface 6 is the interface between bus 8 and bus 4. It will be described in reference to FIG. 7.

The data store and control circuit 30 and 31 which are part of any module 2-1 to 2-N and 2-S, referenced as module 2-i will now be described in reference to FIG. 4. The data store 30 comprises a plurality of message queues which are built in a memory for assembling the messages to be sent to the users or microprocessor or to be received by the users or microprocessor. The queues are divided into two sets, with each set comprising a number of queues equal to the number of interface modules, i.e. N+1. The first set 40 comprises line inbound queues LIQ-1 to LIQ-N and LIQ-S into which the messages to be received by the module 2-i from modules 2-1 to 2-N and 2-S respectively, are chained and queued. This means that a line inbound queue is assigned to each user interface module and service module for storing the packet messages received from the assigned module.

The second set of queues 42 comprises line outbound queues LOQ-1 to LOQ-N and LOQ-S into which the messages to be sent by the module 2-i from the users U-i or microprocessor are chained and queued. Also, each line outbound queue is assigned to a user interface module 2-1 to 2-N and 2-S.

Figure 4:
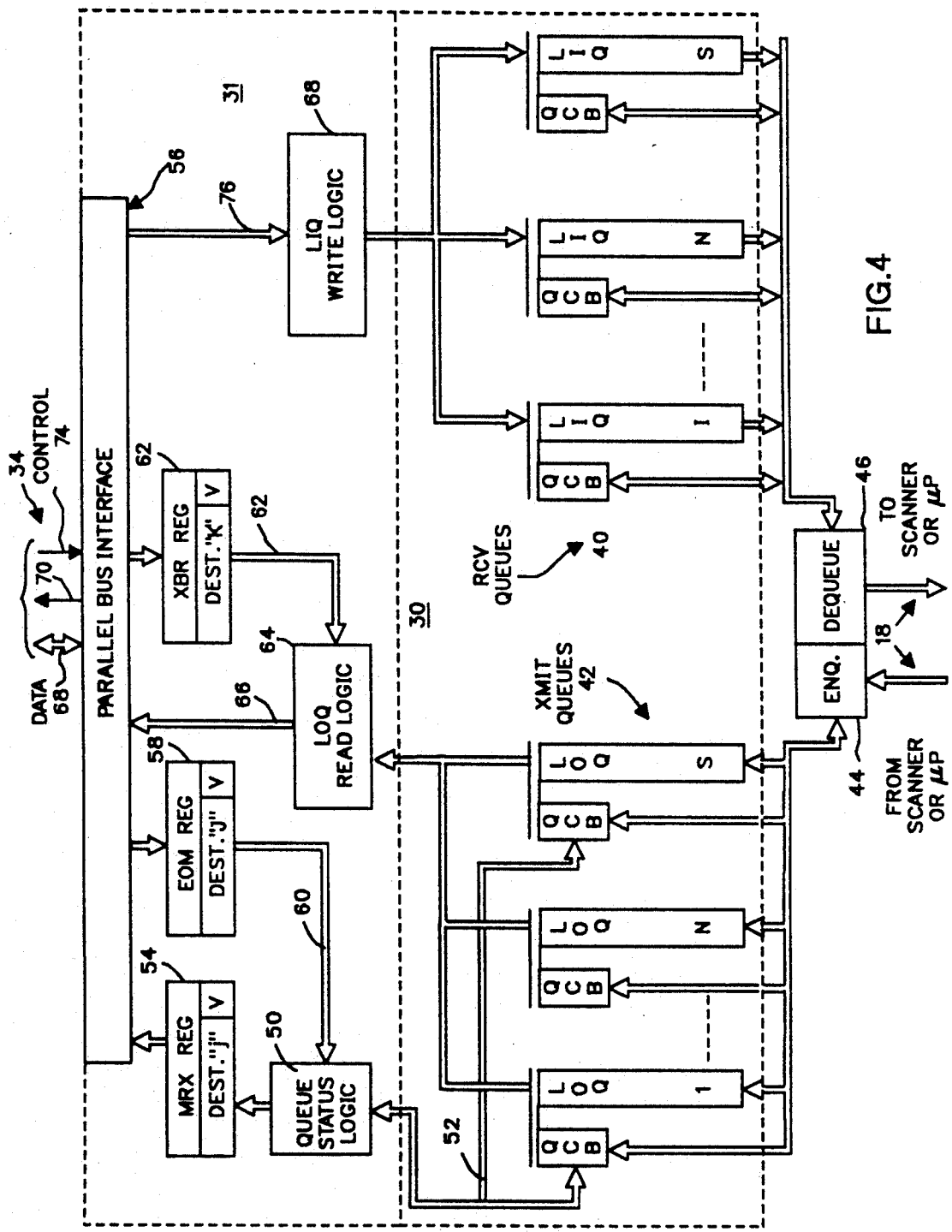
FIG. 4 represents the data store and control circuit 30 and 31 of FIG. 3, in detail.

As is conventional, queue control blocks QCB are assigned to each queue as schematically represented in FIG. 4. These blocks contain control information such as first message, last message, queue empty, byte counts which are needed to control the message transfers.

The messages to be sent by the module 2-i are enqueued in an LOQ queue selected as a function of its destination module by means of an enqueuing mechanism 44 which changes the queue control block contents each time a new message is enqueued.

The message to be received by the module 2-i are dequeued from the LIQ queues through the dequeueing mechanism 46 which is responsive to the queue status information in the queue control block to schedule the dequeueing operations and update the queue control block each time a message is dequeued.

Data Stor block 30 is only shown schematically since it is not part of the subject invention.

In control circuit 31, a queue status logic 50 is responsive to the queue control information in the queue control blocks of the LOQ queues 42 received from bus 52. Each time the status of a LOQ changes from empty to not empty status, the queue status logic 50 provides the queue identification, (which corresponds to the destination module) for example LOQ-j=Destination-j in a MESSAGE READY for TRANSMIT MRX register 54 together with a validation bit V.

The contents of the MRX register 54 can be provided onto bus 34 through a parallel bus interface 56.

END of MESSAGE EOM register 58 receives an indication that the last message toward the destination module has been transferred for example module 2-J together with a validation bit V. The content of register EOM 58 is provided to the queue status logic 50 through bus 60 to update the queue control block of the queue LOQ-j.

A transmit request for a specified LOQ among queues 42, for example queue LOQ-k, is provided by interface 56 in TRANSMIT REQUEST XBR register 62. The request comprises the identification of the destination module corresponding to LOQ-k together with a validation bit V. The contents of this register 62 is provided by bus 64 to LOQ READ logic circuit 64, which causes a packet burst comprising 32 bytes to be read from the identified LOQ-j and provided with packet burst control information to bus 34 through bus 66 and interface 56. The data burst are provided on data lines 68 of bus 34 and the PBC information is provided in series on control line 70. The PBC information is extracted from the queue control block. It qualifies the data burst. It contains information such as:
first burst of message
last burst of message
valid burst
byte count (nominal 32 bytes, can be less in the last burst).

On the receive side, a LIQ WRITE logic circuit 68 receives data and control information from data lines 68 and control line 74 of bus 34 through interface 56 and bus 76 to cause the received data bursts to be written into the LIQ selected by the LIQ write logic circuit 68.

The assembly comprising the packet bus interface 32 and switch bus interface 6 accommodates the packet switched and circuit switched traffic simultaneously, essentially by:
handling the packet switched traffic protocol between the data store 30 and hybrid switch 1,
allowing the scanner 14 to handle the preemptive circuit switched traffic protocol between the scanner 14 and hybrid switch 1.

This principle allows sharing the bandwidth of the hybrid switch 1 between packet and circuit traffic in a ratio determined by the needs of the circuit switched traffic. The sharing is adaptive since the proportion of circuit versus packet traffic can vary dynamically. The preemption of circuit switched traffic reflects the constraints given by its cyclic nature. On the other hand, the packet switched traffic can be handled on an available basis without any constraint of periodicity.

As shown in FIG. 2, the data transfers through the hybrid switch are performed in bursts for the packet switched traffic as well as for the circuit switched traffic. The slicing of data in bursts allows the multiuser mode of operation of the hybrid switch 1 and it also permits sharing between the packet and circuit traffic on the same medium.

The data bursts sent through the hybrid switch 1 are transferred synchronously. This implies the definition of contiguous time windows or "slots" called "burst times". Any given burst time can be used for transferring a packet data burst or a circuit data burst.

The transfers are requested to the hybrid switch through the switch bus interfaces 6. The hybrid switch resolves the contentions and grants the transfers on a burst time basis, giving to the circuit switched traffic higher priority than for the packet switched traffic.

Figure 5:
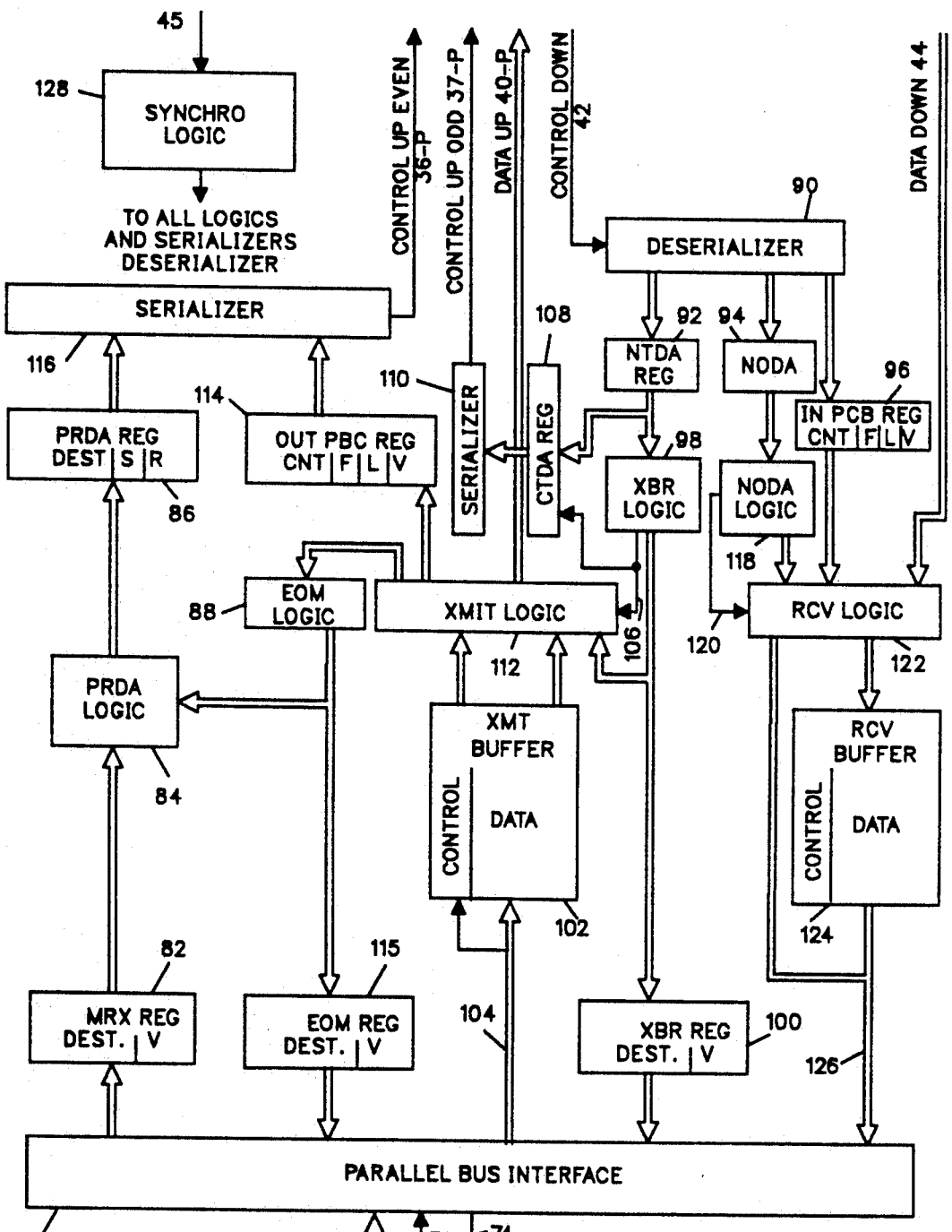
FIG. 5 represents the packet bus interface 32 of FIG. 3, in detail.

The packet bus interface 32 is shown in FIG. 5. It comprises a parallel bus interface 80 which is connected on one side to bus 34 to/from control circuit 31 (FIG. 4) and on the other side to the packet bus interface.

The functions of the parallel bus interface 56 and 80 consist in scheduling the transfers of the register and memory contents through bus 34.

The contents of MRX register 54 is copied into MRX register 82 in packet bus interface 32. A PRDA logic circuit 84 is responsive to the active validation bit V set in register 82 to transfer the contents of MRX register 82 into a PRDA register 86.

The PRDA register comprises a destination field which is filled with the packet request device address and a set/reset bit S/R. The packet request device address is the address of the destination module of the messages in the LOQ queue for which a status change from empty to not empty has been detected by queue status logic 50 in control circuit 31, or the address of the destination module to which the last burst has been sent, which is detected by End of Message logic 88. The S/R bit is set to 1 to have the hybrid switch 1 informed that a new packet transfer request is to be scheduled and reset to 0 when the last burst has been sent.

The content of the PRDA register 86 is a part of the control up information to be provided on the CONTROL UP EVEN line 36-P.

As will be described later on, the hybrid switch runs a scheduling algorithm at each burst time to select pairs of modules, with each pair comprising one origin module and one target module (destination module). The effective data transfers between the modules selected during a burst time, for example Bj, occurs during a next burst time B(j+p) with $p \geq 1$.

At each burst time, each module can be selected or not.

If selected, it can be selected for:
only sending data to a target module, or
only receiving data from an origin module, or
both sending data to a target module and receiving data from an origin module.

When the hybrid switch has run the scheduling algorithm during a burst time, it grants transmissions on a burst time basis. At each burst time it allows each requesting module to transmit a data burst to one of its desired destinations. The grants result from the scheduling algorithm. At each burst time the hybrid switch provides to each module NEXT TARGET DEVICE ADDRESS/NEXT ORIGIN DEVICE ADDRESS NTDA/NODA which is transmitted through CONTROL DOWN line 26. This information is transmitted through bus interface 6 to CONTROL DOWN line 42.

In each module, the received NTDA information comprises the address of the module to which a data burst will be sent during a next burst time, or all "0" if the module has not been selected as an origin module. The received NODA information comprises the address from which a data burst will be received during that next burst time, or "all 0" if the module has not been selected as a target module.

Due to the pipelined architecture of the hybrid switch, there can be a fixed number p of time bursts, which depends upon the specific implementation of the invention, between the grant as indicated by a NTDA/NODA address and the actual transfer of data.

During each burst time, line 42 provides serial information comprised of the NTDA and NODA information and the packet burst control information PBC.

This serial information is inputted in deserializer 90. Once deserialized, the NTDA field is provided to register 92, the NODA field is provided to register 94 and the PBC field is provided to register 96.

The contents of NTDA register 92 is provided to a TRANSMIT BURST REQUEST logic XBR 98, which decodes the NTDA address value.

If the NTDA field is different from "all 0", which means that the module is selected as an origin module involved in a transfer during the next burst time B(j+p), XBR logic 98 provides the NTDA register contents to XBR Register 100 together with an active validation bit V. The contents of register 100 is provided through interface 80, bus 34 and interface 56 to register 62 in control circuit 31 to initiate the transfer of a data burst from the LOQ queue selected by the address of the destination module into a transmit buffer 102 through bus 66, interface 56, bus 34, interface 80 and bus 104. The transmit data buffer 102 is filled with the data burst and associated control bits PBC.

The size of the CTDA field makes it possible to send four CTDA values during one burst time. In packet switched transfers, four identical CTDA values identifying a target module are sent along with the data burst sent to this target module.

The XBR logic 98 activates line 106 to transfer the contents of NTDA register 92 to a Configuration Target Device Address CTDA register 108. The CTDA register contents is provided to serializer 110 and the CTDA bits are serially sent on the CONTROL UP ODD line 37-P.

Also, the active signal on line 106 is provided to transmit logic circuit 112 in order to gate the data burst from the transmit buffer 102 onto the DATA UP bus 40-P and the control bits PBC to an OUT PBC register 114.

The contents of the PRDA register 86 and OUT PBC register 114 are provided to serializer 116 to be serially sent on the CONTROL UP EVEN line 36-P.

END OF MESSAGE logic 88 is responsive to the burst control information PBC read from transmit buffer 102 and detects when the last burst for a destination module identified by NTDA is transferred on bus 40-P to provide the NTDA address into EOM register 115 with an active validation bit and into PRDA register with a S/R bit set to 0 through PRDA logic 84.

The contents of register 115 is provided to EOM register 58 in control circuit 31 through interface 80, bus 34 and interface 56.

On the receive side, the NODA field received at each burst time Bj is decoded by NODA logic 118 which activates line 120 when it detects that this field is different from "all 0" which means that the module will receive a data burst during the next burst time Bj+p from an origin module identified by the NODA field. Line 120 activates RECEIVE logic 122 which causes the next data burst received from DATA DOWN line 44 and the PBC field in register 96 to be stored into a receive buffer 124 to be provided through bus 126 to a selected LIQ queue among queues 40. The LIQ queue is selected by the write control logic 68 in response to the NODA address provided through receive logic 120 onto bus 126.

All the operations of the packet traffic interface are timed by synchronization logic 128 which provides burst synchro pulses and bit clock pulses to each logic circuit such as 84, 88, 98, 118, 112, 122, serializers 110 and 116 and deserializer 90. For the sake of clarity the burst synchro and clock lines are not shown in FIG. 5.

Figure 6B:
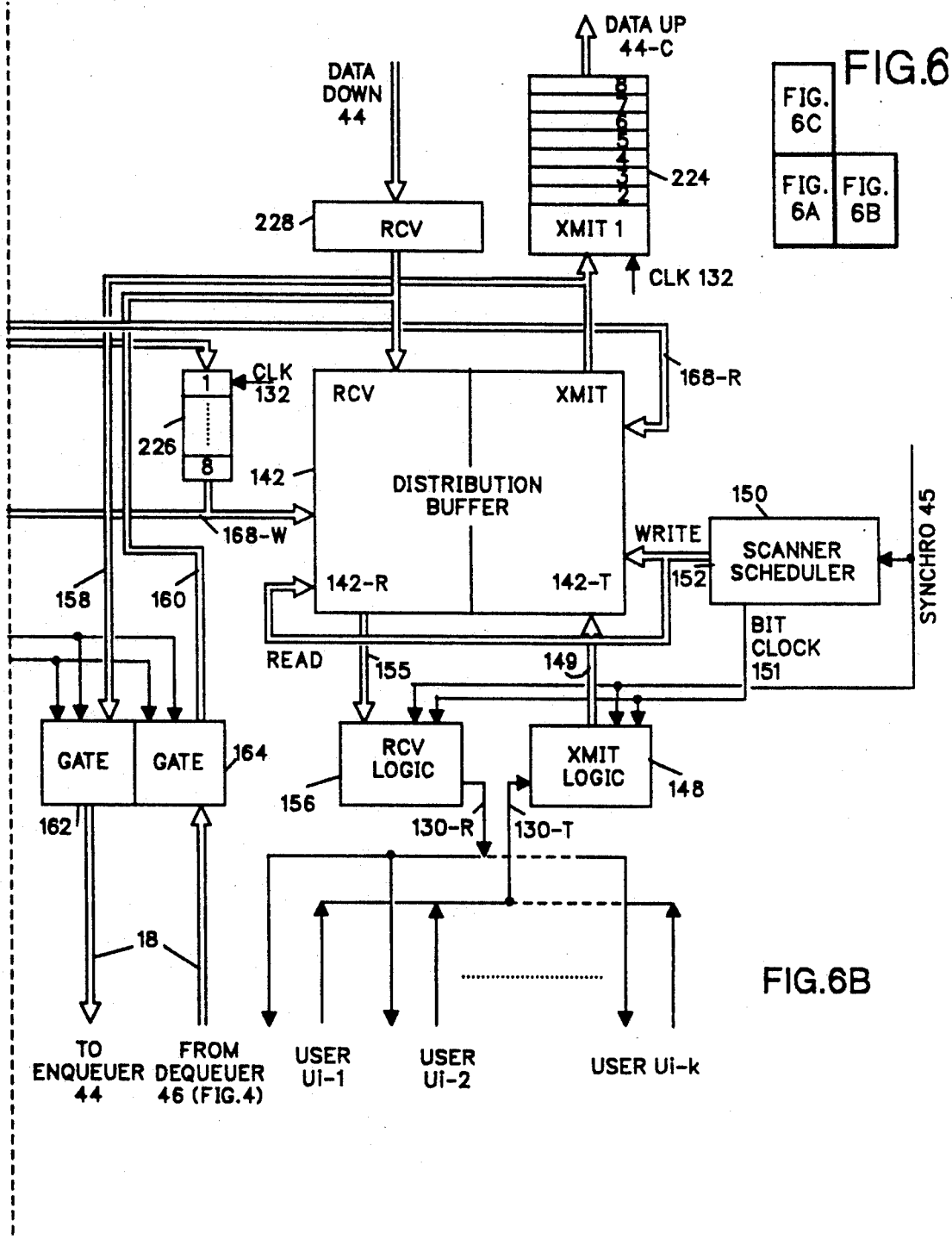
FIGS. 6-A, 6-B and 6-C when assembled as shown in FIG. 6 represent the scanner 14 of FIG. 3.
Figure 6A:
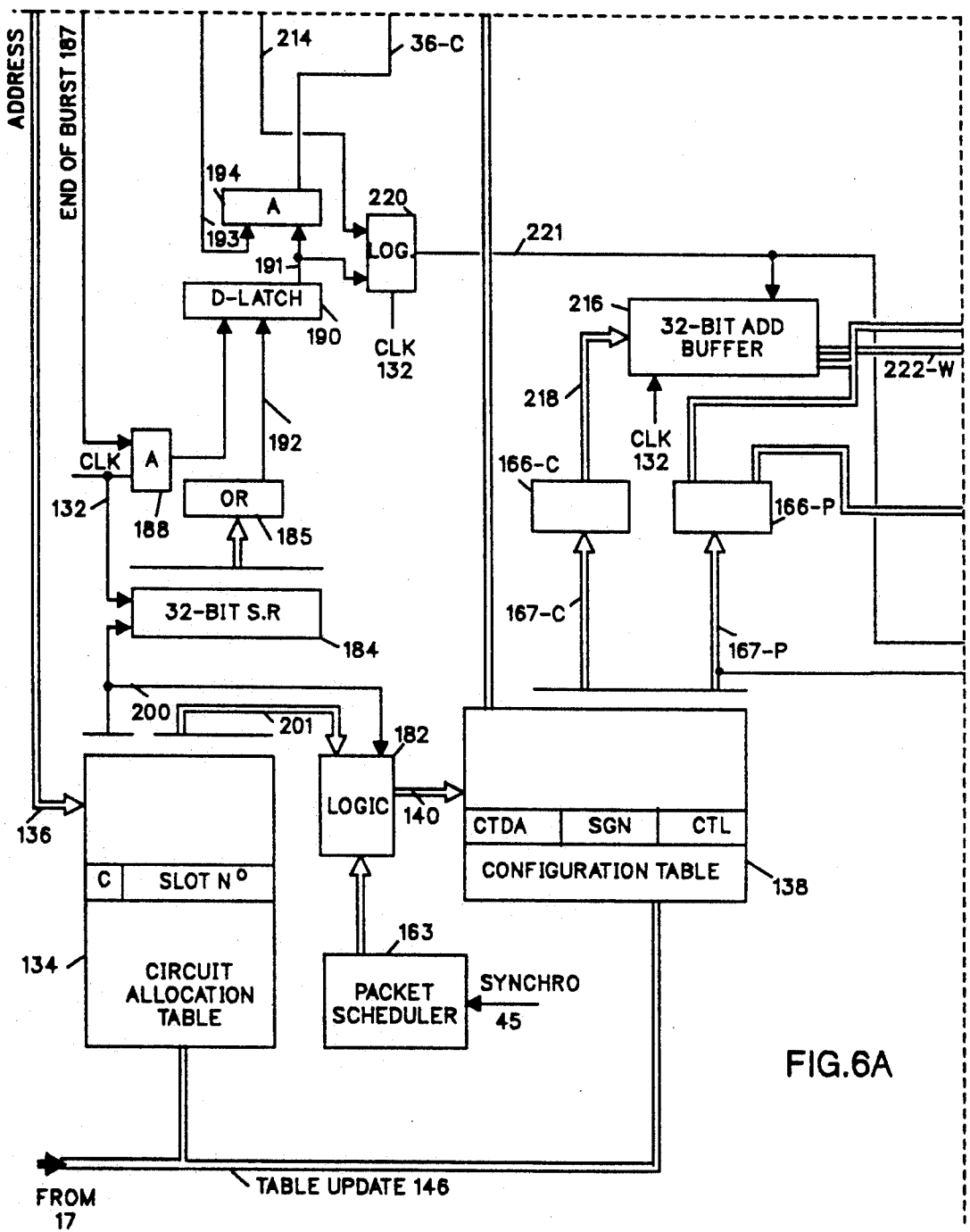
Figure 6C:
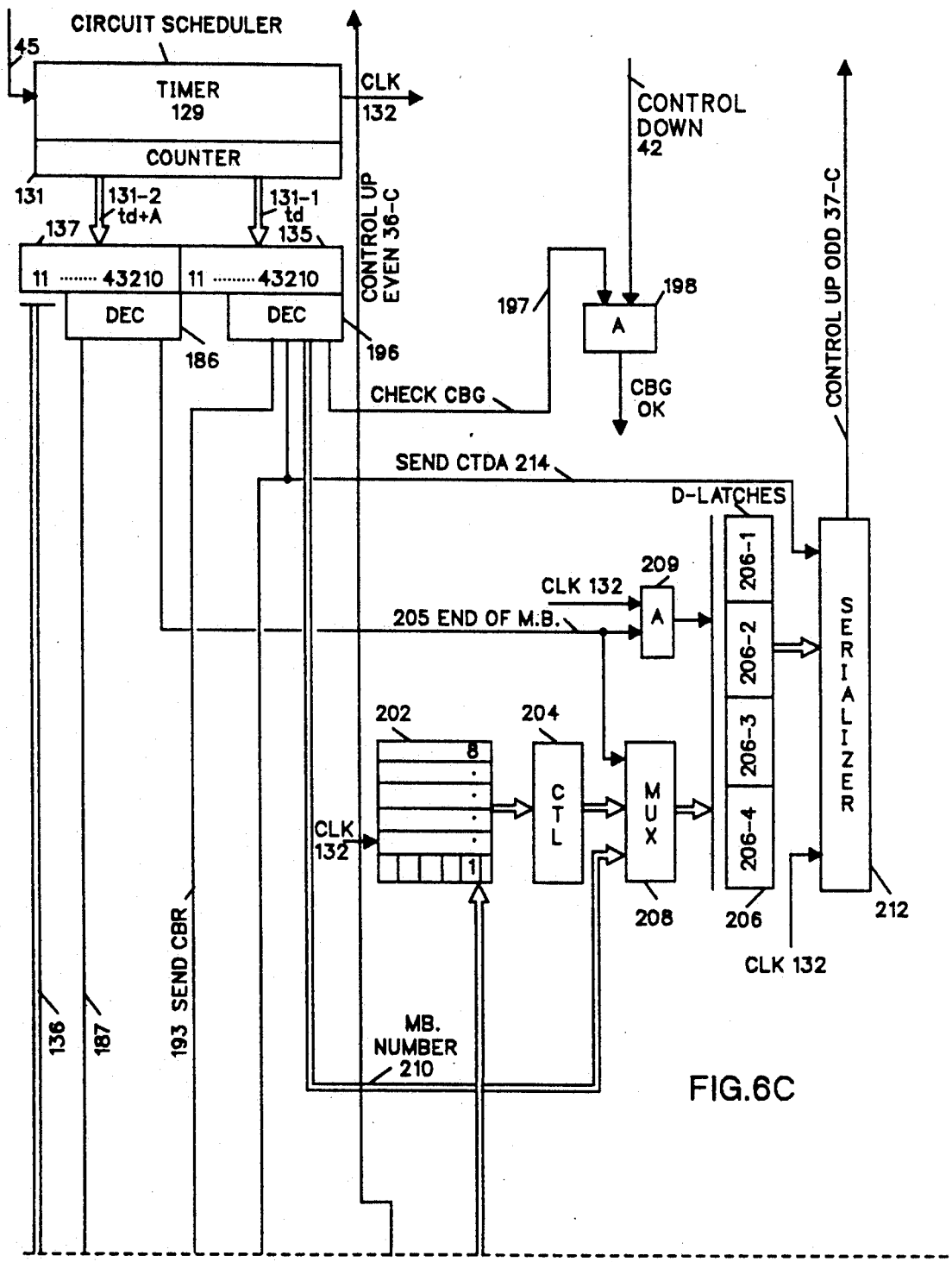

The scanner 14 will now be described in reference to FIG. 6A, 6B and 6C. Only the components required for the purpose of implementing the subject invention are shown in these figures.

The users are attached to the scanner through serial link 130 which comprises a receive link 130-R and a transmit link 130-T. As explained before, a number of slots s— on the serial links 130-R and 130-T in a time period T is assigned to each user. At least one data slot and one signalling slot are assigned to a user which is able to work in circuit switching mode, the number of data slots being dependent upon the user speed and used for exchanging circuit type bits between two users and the signalling slot being used to carry the call control information for establishing and releasing the communication between the users.

In FIG. 6, the reference numbers of the components in scanner 14 are not provided with a suffix. In the description a suffix 1 to N will be added to the reference to identify a component in a specific module 2-1 to 2-N respectively.

In scanner 14, a circuit scheduler comprises a timer 129 which is responsive to the synchro signal from line 45 to derive a TDM bit clock signal on CLK line 132 with a 60 ns period and a counter 131 which counts the bit times td in the T period, with td=60 ns. There are 2048 bit times td in a T period. The current value reached by counter 131 is provided through bus 131-1 into 11-bit register 135. Counter 131 also provides on bus 132-2 a counter value Td+A which is loaded in 11-bit register 137, where A is equal to a fixed number of td times which depends upon the hybrid switch circuit 1, as will be described later on.

Timer 129 is permanently synchronized by the T-synchro signal in order that all the modules which communicate through the TDM busses 4 and hybrid switch 1 have the same time reference.

Scanner 14 also comprises a circuit allocation table 134 which is addressed by the address provided by register 137 on its output bus 136, a configuration table 138 addressed through address bus 140 and a distribution buffer 142 comprised of a transmit part 142-T and a receive part 142-R.

The contents of the circuit allocation table 134 and of the configuration table 138 are updated by microprocessor 17 through table update bus 146.

Each part of the distribution buffer 142 comprises at least one addressable location per user. In a preferred embodiment of the present invention it comprises 128 addressable locations.

The transmit link 130-T is provided to XMIT logic 148 which is responsive to the T-synchro signal from line 45 and to a link bit clock signal on line 151 derived from this T-synchro signal by a scanner scheduler device 150 to deserialize the bits received during each slot and write these bits into the transmit part 142-T at the addressable location corresponding to the user to which the slot is assigned. The address of the location is provided by scheduler 150 on bus 152 and the data to be written into part 142-T are provided through bus 149.

At each slot time on link 130, a location addressed through bus 152 is read from part 142-R and the read data are provided through bus 155 to a receive logic 156 to be deserialized under control of the T-synchro signal from line 45 and bit clock signal from line 151 to be sent on receive link 130-R.

The circuit allocation table 134 comprises as many addressable positions as there are slot times td on the TDM bus, i.e. 2048 slot times in the preferred embodiment of the invention. Each position contains a flag bit C which is set to 1, by the processor 17 when the corresponding slot on the TDM bus 4 is assigned to a circuit transfer and in this case, it also contains the number of the slot on the link 130 whose contents is to be sent to DATA UP line 44-C or to be received from DATA DOWN line 44 during that TDM slot time.

Configuration table 138 comprises a number of addressable locations equal to the maximum number of users attached to the scanner i.e. 128. Each location comprises three fields, namely a control field, a slot group number SGN field and a configuration target device address field CTDA. The control information field comprises a P/C field indicating whether the addressed location is assigned to a packet bit slot or a circuit bit slot on link 130, in addition to any information which may be useful in specific applications of the invention. The SGN field is set with the user number assigned to the slot number corresponding to the addressed location and the CTDA field is set with the target device address when the slot is a circuit bit slot.

The packet transfers from/to the users attached to the scanner 14 is performed through distribution buffer 142, busses 158 and 160 and gates 162 and 164 under control of a packet scheduler 163.

Scheduler 163 is responsive to the T-synchro signal from line 45 to provide on its output bus 165 an address corresponding to a slot number among the 128 slots in a T period. This address is provided through gating logic 182 to address bus 140, when the slot is not assigned to a circuit communication, as will be described later on.

The contents of the addressed location in table 138 is read. The SGN and control fields are provided to gating logic 166-P and 166-C through bus 167-P and 167-C respectively. If the P/C field indicates that the slot is a packet bit slot, gates 162 and 164 are open and the SGN field is provided on address bus 168-R to cause the location of part 142-T assigned to the user identified by the SGN field to be read, gated on bus 18 by gate 162 and provided to enqueuer 44 (FIG. 4). The packet bits, received from dequeuer 46 to be provided to the user identified by the SGN are written into the receive part 142-R at the address provided on bus 168-W through logic part 166-P which gates the SGN value on bus 168-W when the P/C bit is indicative that the slot is a packet slot. These bits are provided to the user when the contents of this location is read and provided to the receive logic 156.

It will be assumed in this description that a circuit type communication is to be established between one user, for example user Ui-1 attached to module 2-i, with one user Uj-3 attached to module 2-j, with two circuit slots x1 and x2 assigned to user Ui-1 and y1 and y2 assigned to user Uj-3.

Scanner 14-i in module 2-i sends a call request packet comprising the calling user address and the called user address to service module 2-S through a packet slot. In response to the call request packet the processor 16-S in service module sends a packet Pi to module 2-i and a packet Pj to module 2-j. These packets comprise the parameters needed for establishing the communication and include the TDM slot numbers, for example Td1 and Td2 which are assigned on the TDM bus 4-i and 4-j to the communication. The processor 16-S manages and retains the slot allocations for the circuit connections.

At least one packet burst must remain available on the TDM busses 4-1 to 4-N and 4-S to allow the circuit connection establishment and release.

In another implementation of the present invention the slot allocations can be performed by the processors in the user interface modules by assigning the management of given slot numbers to each processor.

The packets Pi and Pj are received by processors 17-i and 17-j which update the tables 134-i and 134-j and 138-i and 138-j as shown in the following tables I and II

TABLE I

| Circuit Allocation Tables | |
|---|---|
| 134-i | 134-j |
| Address td1: | Address td1: |
| C set to 1 | C set to 1 |
| Slot Number= x1 | Slot Number= y1 |

TABLE I-continued

| Circuit Allocation Tables | |
|---|---|
| 134-i | 134-j |
| Address td2: | Address td2: |
| C set to 1 | C set to 1 |
| Slot Number= x2 | Slot Number= y2 |

TABLE II

| Configuration Tables | |
|---|---|
| 138-i | 138-j |
| Address x1: | Address y1: |
| Control P/C=1 | Control P/C=1 |
| (Circuit mode) | |
| SGN= user 1 | SGN= user 2 |
| CTDA= module 2-j | CTDA= module 2-1 |
| Address x2: | Address y2: |
| Control P/C−1 | Control P/C=1 |
| (Circuit mode) | |
| SGN= user 1 | SGN= user 2 |
| CTDA= module 2-j | CTDA= module 2-i |

Once the tables are updated, the communication can be established.

Since a T period comprises 2048 TDM slots, the slot number is comprised of 11 bits. The six most significant bits 10 to 5 represent the burst number inside the period T, bits 4 and 3 represent the mini-burst number inside the burst and the three least significant bits 2, 1 and 0 represent the byte number inside a mini burst. At each time slot Td, which belongs to a current burst Bc, the circuit allocation table 134 is accessed with an address Td+A, to prepare the communication at the time slot Td+A where data are received. This implies that the XMIT data for the same time slot are provided earlier to the hybrid switch due to the time delay in the hybrid switch.

At each td current time slot, the Td+A address is applied to the circuit allocation table 134 and the C bits are read from this addressed location and inputted into a 32-bit shift register 184. Time Td+A belongs to a burst Ba which can be allocated to at least one circuit communication. The 32 bits in shift register 184 are provided to OR circuit 185. When all the positions corresponding to the burst Ba in the circuit allocation table 134 have been read, bits 0 to 4 in the register 137 are equal to 1 and decoder 186, which is responsive to these bits, provides an active signal at one input 187 and AND gate 188 to gate the clock signal from line 132 on the C-input of D-latch 190. This latch 190 provides, on its output line 191, a signal which has the value of the signal on the output line 192 of OR gate 185 which is connected to the D-input of latch 190.

Consequently, if there is at least one bit C at "1" in the circuit allocation table for the burst Ba, the output signal of D-latch 190 is set at 1 and a CBR bit is sent on CONTROL UP EVEN line at the right position in current burst Bc through AND gate 194 which has one input connected to line 191 and one input connected to SEND CBR line 193 activated by decoder 196 at the right position of the current burst.

If there is no C bit at 1, no CBR bit is sent.

At another time in the current burst determined by decoder 196, line CHECK CBG 197 is activated to condition AND gate 198, which checks whether a CBG bit from CONTROL DOWN line 42 is set at 1.

A logic block 182 is controlled by the C bit read from allocation table 124 on line 200 to gate the slot number read from the table 134 and provided on bus 201 on address bus 140. (If the C bit is at 0, the address from packet scheduler 163 is gated on bus 140). At each access to table 138, the CTDA field read from table is inputted into shift register assembly 202 under control of the clock signal on line 132. Shift register assembly 202 comprises one shift register per bit in the CTDA field, each shift register has eight stages.

A control circuit 204 checks whether the contents of shift registers in assembly 202 are identical. At the end of the miniburst time in burst Ba, determined by the bits 0,1,2 in register 137 which are equal to 1, decoder 186 activates line 205. The clock signal from line 132 is gated on the C-inputs of 32 D-latch assembly 206, through AND gate 209. Multiplex 208 gates the common CTDA value found in shift register assembly, if any, or "0" bits if there is no valid CTDA bits, onto the D-inputs of eight D-latches 206-1, 206-2, 206-3 or 206-4 selected by the miniburst number indicated by bits 3 and 4 in register 135 and provided on bus 210.

Bits 4 3 = 0 0 CTDA bits or 0 bits are loaded into latches 206-1
= 0 1 CTDA bits or 0 bits are loaded into latches 206-2
= 0 0 CTDA bits or 0 bits are loaded into latches 206-3
= 0 1 CTDA bits or 0 bits are loaded into latches 206-4

The contents of the D-latches 206 is transferred into serializer 212 when the decoder activates the SEND CTDA line 196 at a selected time after the end of the current burst Bc and the contents of the serializer 212 is shifted under CONTROL UP ODD line 37-C under control of the clock signal on line 132.

At each td time, the SGN field, if any, or "0" bits are gated by gate 166-C into an address buffer assembly 216. Address buffer comprises a number of 32-bit shift registers controlled by the clock signal on line 132, equal to the number of bits in the SGN field.

The SGN or "0" bits provided from bus 218 are shifted into registers of assembly 216.

Logic 220 is responsive to the output signal from D-latch 191 which indicates that burst Ba is a circuit burst and to the SEND CTDA signal from line 214 to gate the 32 addresses from the left side of address buffer 216 on address bus 168-R and 222-W and close gates 162 and 164.

The XMIT data read from the XMIT part of buffer 142 are inputted into XMIT buffer 224 comprising one eight-stage shift register per data bit controlled by the clock signal on line 132, to be sent on the DATA UP line 44-C.

The addresses from bus 222-W are buffered in buffer 226 comprising one shift register per address bit. Each register is controlled by the clock signal on line 132 has a number of stages which depends upon the switching and transmission delays. The addresses are provided as write addresses to the receive part 142-R of the distribution buffer where the data from DATA DOWN bus 44 received in register 228 are written.

The circuit switch communications are terminated by the processor in the service module which sends call release packets to cancel the slot allocations in the tables 134 and 138 for the modules involved in the circuit communications.

Figure 7:
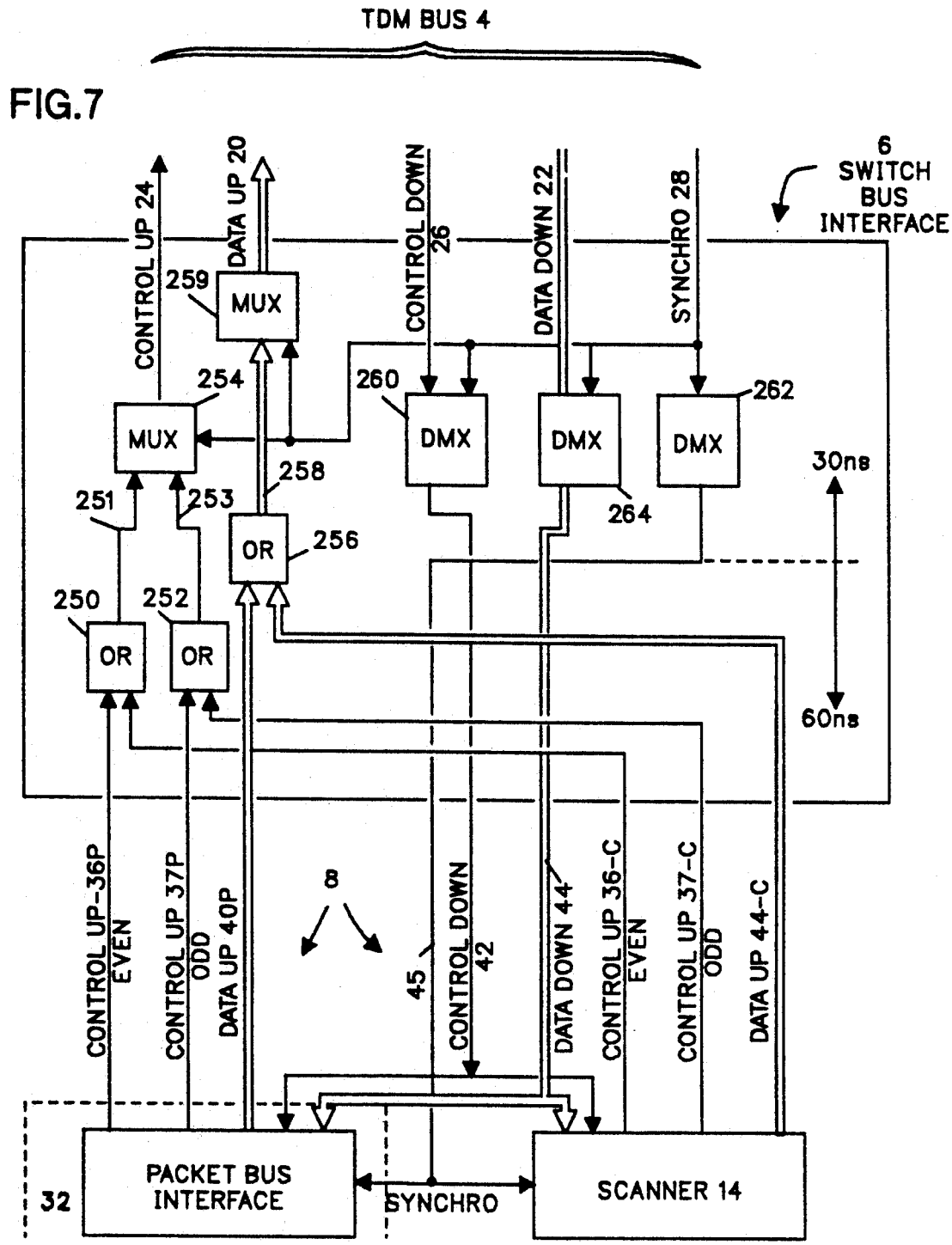
FIG. 7 represents the switch bus interface 6 of FIG. 3.

FIG. 7 represents the switch bus interface 6.

In the preferred embodiment of the present invention, the bit time bt-8 on interface lines 8 between the packet bus interface 32 and scanner 14 is 60 nanoseconds. This corresponds to two bit times bt-4 on TDM bus 4, with bt-4 equal to 30 ns.

At each bit time equal to 60 ns, one data byte (8 bits) is transferred on bus 8 through DATA UP or DATA DOWN bus 40-P, 40-C or 44 and at each half-bit time equal to 30 ns one half byte (4 bits) is transferred on bus 4 through DATA UP or DATA DOWN bus 20 or 22.

The function of switch bus interface 6 consists in performing the bit time adaptation.

CONTROL UP EVEN lines 36-P and 36-C are provided to OR circuit 250 and CONTROL UP ODD lines 37-P and 37-C are provided to OR circuit 252.

A multiplexing circuit 254 merges the bit streams from the output lines 251 and 253 of OR circuit 250 and 252 on CONTROL UP line 24 by taking alternatively one bit from each line 251 and 253. As shown in FIG. 8, the burst time on CONTROL UP line comprises $32 \times 2 = 64$ bit times bt-4. The bit times having an even number such as b0, b2 to b10 are used to carry the PRDA bits; bit b12 is allocated to carry the S/R bit and bit 14 is allocated to carry the CBR bit; bits b16 to b62 are used to carry the PBC and parity control bits from CONTROL UP EVEN lines 36-C and 36-P.

The bit times having an odd number, b3 to b13, b19 to b29, b25 to b45 and b51 to b61 are used to carry the CTDA bits assigned to each miniburst in a burst time, received from CONTROL UP ODD line 37-P or 37-C; bits b1, b17, b33 and b49 being set to 0 and bits b15, 131, b47 and b63 being used to carry parity bits associated with the CTDA fields.

The format of a burst time on the CONTROL DOWN line 22 is shown in FIG. 8-C. Only the even bit times are significative. Even bit times b0 to b10 are allocated to NTDA bits b12 is set to 0, bit 14 is allocated to CBG bit, bits 16 to bits 46 are allocated to PBC bits, bits b48 to b58 are allocated to NODA bits, bit 60 is set to 0 and bit b62 is the parity bit.

DATA UP bus 40-P and 44-C are provided to OR circuit 256, the output bus 258 of circuit 256 is multiplexed by multiplexing circuit 259 on 4-bit DATA UP bus 20.

CONTROL DOWN line 26 is provided to demultiplexing circuit 260 which generates the bit stream on line 42 with a 60 ns period.

DATA DOWN bus 22 is provided to demultiplexing circuit 264 which generates the data bytes on DATA DOWN bus 44.

A synchro signal from line 28 is provided to demultiplexing circuit 262 which generates the synchro signal on line 45.

Figure 9:
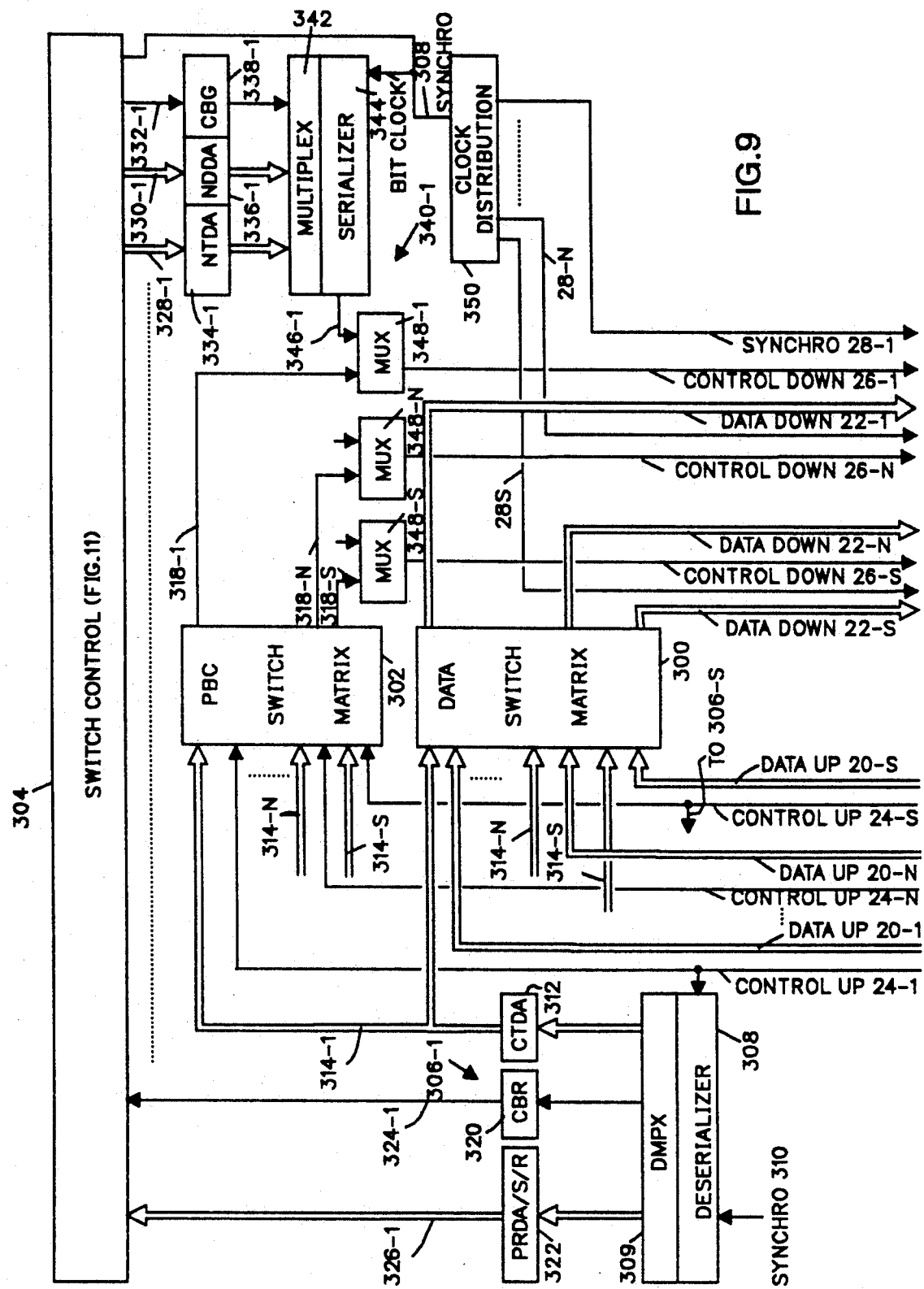
FIG. 9 represents the hybrid switch 1 of the FIG. 1.

The hybrid switch 1 is shown in FIG. 9. It comprises a data switch matrix 300, a PBC switch matrix 302 and a switch control circuit 304 which will be described in reference to FIG. 10.

The data switch matrix 300 allows selected DATA UP busses 24-1 to 24-N or 24-S to be connected to selected DATA DOWN busses 22-1 to 22-N or 22-S during a whole burst time for a packet bit transfer or during a miniburst time for a circuit bit transfer.

As conventional, data switch matrix 300 comprise a plurality of switches (not shown) which can be closed in response to the configuration target device addresses received from the CONTROL UP lines 24-1 to 24-N or 24-S. CONTROL UP lines 24-1 to 24-N and 24-S are connected to arrangements 306-1 to 306-N and 306-S.

Only the arrangement 306-1 is shown in FIG. 9. It comprises a deserializer 308 controlled by the TDM bit clock signal from line 308 having the 30 ns period. The CTDA field assembled in deserializer 308 at each miniburst time is gated into register 362 through a demultiplexing circuit 309.

The contents of register 312 in the arrangements 306-1 to 306-N and 306-S are provided to the data switch matrix 300 through busses 341-1 to 314-N and 314-S and to the PBC switch matrix 302 to control the connections of the selected DATA UP and DATA DOWN busses and of the corresponding the CONTROL UP lines 24-1 to 24-N and 24-S and output lines 318-1 to 318-N and 318-S of the PBC switch matrix 302.

In each circuit 306-1 to 306-N and 306-S, demultiplexer 309 provides the CBR bit in each burst into register 320 and the PRDA S/R bits into register 322.

The contents of register 320 and 322 are provided to the switch control circuit 304.

In FIG. 9, only output line 324-1 and output bus 326-1 from register 320 and 324, respectively, in circuit 306-1 are shown.

Figure 10:
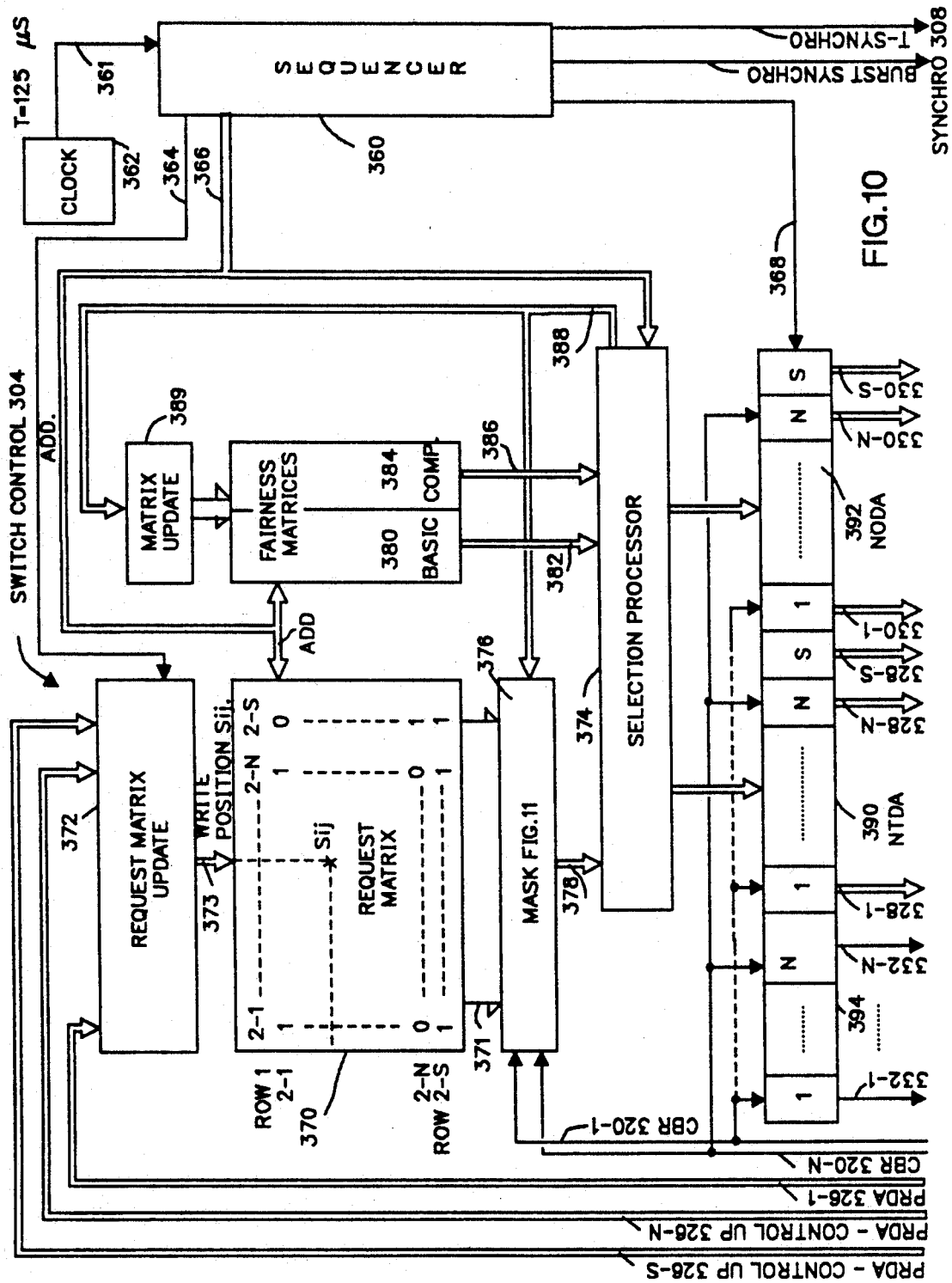
FIG. 10 represents the control part 304 of the hybrid switch shown in FIG. 9.

As will be explained in reference to FIG. 10, the switch control circuit 304 generates the NTDA and NODA address values to be sent to each module. An NTDA address value for module 2-1 is provided on bus 328-1, and a NODA address value is provided on bus 330-1 and a CBG bit is provided on line 332-1. They are stored in registers 334-1, 336-1 and 338-1.

There is one circuit 340-1 for each module comprising multiplex circuit 342 which arranges the bits from registers 334-1, 336-1 and 338-1 and serializer 344 which serializes them on line 346-1 under control of the synchro signal from line 308.

Multiplexers 348-1 to 348-n and 348-S merge the bit streams from the selected CONTROL UP lines with the bit streams from lines 346-1 to 346-N and 348-S to generate the control down bit streams on CONTROL DOWN lines 24-1 to 24-N and 24-S as shown in FIG. 8-C.

To synchronize all the user interface modules, the switch control circuit 304 sends a 125 microseconds synchro signal. For minimizing the physical interfaces, this synchro signal is multiplexed on one line 308 which also carries the burst time synchro signal. The resulting signal is a composite synchro signal provided to clock distribution circuit 350 which is responsive to the synchro signal from line 308 to redrive the synchro signal to each module through lines 28-1 to 28-N and 28-S.

The switch control circuit 304 comprises a sequencer 360 which is responsive to a clock signal on line 361 from clock circuit 362 at a frequency 1/T to provide the composite synchro signal on line 308 and control signals on lines 364 and 368. The burst time is divided into a number of cycles which is at least equal to the user interface module number (N+1), plus 1.

At each cycle, sequencer 360 provides an address on the bus 366 which corresponds to the cycle number.

In a preferred embodiment of the invention, the packet transfer requests from the modules 2-1 to 2-N and 2-S are logged in a request matrix memory 370 which comprises (N+1)×(N+1) storing positions. A "1" in any storing position Sij in row i and column j, indicates that an origin module 2-j has a pending request toward a target module 2-i and a "0" indicates that there is no pending request.

The packet interface 12 in each module 2-1 to 2-N and 2-S can send a request during any burst time through the PRDA fields and S/R bit provided to the switch control circuit by means of bus 326-1 to 326-N and 326-S. The requests are received by a request matrix update circuit 372 which updates the request matrix in response thereto.

A selection algorithm is run to generate the NTDA and NODA fields by selection processor 374. Any algorithm which gives an equal chance to the requests to be serviced is acceptable. Such an algorithm is described in European Patent Application No. 89480047.3. As fully described in this Patent Application, at each cycle, the algorithm is run during each burst time Bj on a row of the request matrix which is read and provided to the selection processor though a masking circuit 376. The first row which is processed at each burst time changes, the starting address is incremented by 1 in order to assure that the selection algorithm is fair and the mask is blank (for example set at "all 0"). It is thus inactive for the first row, provided that there was no CBR bit active during the previous burst time B(j−q) with q=1 in a preferred embodiment of the invention as will be explained later on. This means that the row which is read and provided to selection processor 374 is not altered by the mask. The mask comprises as many positions as there are columns in the matrix. A row which is read from the matrix and applied to the mask circuit 376 can be altered since a 1 in a position of the mask causes the value in the column corresponding to this position to be set to 0.

The selection processor selects in the masked row which is provided through bus 378 the first "1" encountered after a position given by another N+1 bit pattern read from either the basic fairness matrix 380 or complementary fairness matrix 382 which are addressed by bus 366. The matrix provides the row which is read at each cycle to the selection processor through busses 382 and 384. Basic fairness matrix 380 stores the indication of the module which was selected as origin module when the row was processed as the first row during a burst time and the complementary fairness matrix 382 stores the indication of the module which is selected as origin module during each cycle. These are updated through matrix update circuit 389. The mask is updated at each selection of an origin module when a row is processed to prevent the same module from being selected several times as an origin module during a burst time. This means that the row contents which are provided to the selection processor are altered by the mask. The mask is updated by the selection processor through bus 388.

NTDA and NODA registers 390 and 392 comprise N+1 stages with one stage allocated to one module 2-1 to 2-N and 2-S. They provide on their output busses 328-1 to 328-N and 328-S and 330-1 to 330-N and 330-S, the NTDA and NODA fields which are determined during each burst time by selection processor 374. These fields can be sent during the same burst time Bj when the selection algorithm is completed or can be sent during the next burst Bj+1. In that latter case, the CTDA fields generated from the NTDA fields received by the modules are sent during the burst times Bj+2 and the corresponding data bursts are sent during the burst time Bj+3 so that the connections in the data switch matrix 300 and control switch matrix 302 are established in response to the CTDA fields.

The circuit burst requests which originate from the modules have priority over the packet burst requests. The circuit switching requires that the connections be established at determined times. The circuit burst requests, if any, have to be serviced immediately, i.e. as soon as they are posted on the CBR lines 320-1 to 320-N. There is no CBR line for module 2-S since this module does not comprise any scanner 14.

These CBR lines are provided to the mask circuit 376 shown in FIG. 11 to set the mask at an initial value different from its blank value, which can be "all 0" as explained before, when the CBR lines are activated. The mask circuit comprises as many positions as there are columns in the request matrix, and a "1" in a position prevents the request set in the corresponding column being selected when the successive rows are provided to the selection processor through the mask circuit during the burst time. Thus, the packet requests for the origin modules which have posted circuit burst requests during the burst time are not selected during that burst.

The CBR lines 320-1 to 320-N are also provided to the positions 1 to N of NTDA and NODA registers 390 and 392, respectively, to prevent the contents of the NTDA and NODA fields being sent to the modules for which the CBR lines 320 are active.

Thus, the circuit connection is automatically granted thanks to the masking operation, since the packet requests originating from the modules involved in circuit connections for a burst are not taken into account in the selection process which leads to the generation of the NTDA and NODA information for this burst.

In another implementation of the masking operation, the rows of the matrix which correspond to the target modules involved in the circuit connections, as indicated by the CBR bits, can be masked, i.e. set to "1" instead of preventing the NTDA/NODA information from being sent under control of the CBR bits.

The CBR bits are provided to delay circuits 394-1 to N and sent as CBG bits on lines 332-1 to 322-N.

The mask circuit 376 shown in FIG. 11 comprises a mask register 400 having N+1 stages 400-1 to 400-N and 400-S.

All the positions are set to "0" at the beginning of each burst time Bj except if CBR bits have been set to "1" during the previous burst time B(j−1).

The CBR lines 320-1 to 320-N are provided to the D inputs of D latches 402-1 to 402-N, respectively and a "0" is provided to the D-input of D-latch 402-S. The burst time clock signal from line 308 is provide to the C inputs of these latches.

Thus, at the beginning of each burst time, the output signal on the Q outputs of latches 402-1 to 402-S are set to 0 except if the CBR lines are set at 1.

The output lines 404-1 to 404-N and 404-S of D-latches 402 are provided to one input of OR gates 406-1 to 406-N and 406-S to initialize the contents of mask register 400 at the beginning of the burst time.

Then, during the burst time, register 400's content is changed as a function of the module which is selected each time a row of the matrix 370 is processed, as indicated by the signal on lines 388-1 to 388-N or 388-S from the selection processor.

An active signal on line 388-1 for example, indicates that module 2-1 is selected as origin module.

Lines 388-1 to 388-N and 388-S are provided to the second input of OR gates 406-1 to 406-N and 406-S, respectively.

The output lines of OR gates 406 are provided to the inputs of stages 400-1 to 400-N and 400-S of mask register 400.

The contents of each stage of mask register 400 is provided by lines 408-1 to 408-N and 408-S to inverters 410-1 to 410-N and 410-S.

AND gates 412-1 to 412-N and 412-S are conditioned by the output signals from inverters 410-1 to 410-N and 412-S. To gate the value Sx1 to SxN and SxS, read from the rows of the request matrix from line 371-1 to 371-N and 371-S, where x represents the number of the row read at each cycle of the burst time.

Thus, the masked row is provided by AND gates 412-1 to 412-N and 412-S on bus 378.

Each time the selection algorithm is run on a row, the row number indicates the selected target module if any selected during the burst time cycle and the column number of the selected request is indicative of the origin module.

The system according to the subject invention as described in this description performs the mix of circuit and packet traffic between user interface modules such as adapters of a communication controller, through a switching arrangement (1) which presents the following advantages:

there is no reserved bandwidth between circuit and packet traffic, and the splitting of the bandwidth between the circuit and packet traffic is dynamic.

there is no marking table for the circuit path inside the switching arrangement itself, the marking information are kept inside the user interface modules.

This leads to a very simple switch over function from a switching arrangement to a backup switching arrangement when the invention is implemented in a communication node which makes use of two switching arrangements for fault-tolerance purposes because there is no need of updating marking tables in the backup switching arrangement.

The circuit traffic uses the bursts as defined in the marking tables inside the user interface modules. For a given burst time if a circuit exchange is performed between two user interface modules, the other user interface modules are not forced to perform circuit exchange but can transfer packets.

This is not possible on conventional TDM multipoint bus and in conventional switch implementations.

The advantages of the subject invention are obtained thanks to the routing indication which is common to the two types of traffic, which consists in piggy backing the target address in the same way, for circuit exchanges and packet transfers, with the circuit and packet information to be switched.

To optimize the bandwidth use for circuit bursts, a circuit re-allocation can be performed inside a circuit communication which lasts over several T periods, in order the four mini-bursts be, insofar as possible, allocated to circuit exchanges.

We claim:

1. A packet and circuit switching system for a communication node which comprises switching means, a plurality of interface communication modules, each module being connected to the switching means through an input bus and an output bus, and comprising at least a packet information processing unit and, for at least two of said modules, a circuit information processing unit, said switching means being able to selectively connect input busses to output busses in order to allow transfers of packet or circuit information to be performed between user interface modules in frames of time period T, divided into a fixed number b of burst times Bj, with j lying between 0 and b−1, said burst times being comprised of slots td, with each slot being able to carry circuit or packet information bytes, said system being characterized in that it comprises:

selection means located in said switching means, which selection means are responsive to packet transfer requests received from said packet information processing unit in said user interface modules through said input busses to select, during each burst time Bj, pairs of said user interface modules comprising an origin module and a target module between which packet information will be transferred during a next burst time (B(j+p), p being an integer number equal to or higher than 1, inhibiting means responsive to circuit transfer requests received from circuit information processing units in said user interface modules through said input busses to select, during each burst time Bj, pairs of said user interface modules comprising an origin module and a target module between which packet information will be transferred during a next burst time B(j+p), p being an integer number equal to or higher than 1, said inhibiting means being responsive to circuit transfer requests received from circuit information processing units in said user interface modules through said input busses during a burst time B(j−q), q being an integer number equal to or higher than 1, to prevent the modules from which the circuit transfer requests are received from being selected by the selection means as origin and target modules during burst time Bj, and circuit information transfer enabling means in each said circuit information processing unit which causes circuit information to be transferred from the circuit information processing unit within an origin module to the said circuit information processing unit within a target module during the burst time B(j+p) when said circuit information processing unit within the said origin module has sent a circuit transfer request during burst time B(j−q).

2. A packet and circuit switching system according to claim 1, characterized in that each input bus comprises:

a data bus input means connected to the packet and circuit information processing units to provide the packet or circuit information to the switching system, control bus input means connected to the packet and circuit information processing units to provide input control information to the switching means, said input control information comprising the packet or circuit transfer information requests and switching control information which identifies the target module to which the packet or circuit information provided on the data bus means is to be transferred.

3. A packet and circuit switching system according to claim 2 characterized in that each output bus comprises:

said data bus output means connected to the switching system to provide said circuit or packet information transferred by the switching system during each burst time B(j+p) to the target module, control bus output means connected to the switching system to provide output control information to the user interface module, said output control information comprising the identification of the target module to which the user interface module will have to send packet information if it was selected as origin module during the burst time Bj and the identification of the origin module from which the user interface module will received packet information if it was selected as a target module during the burst time Bj, the identification of the target module being received by the packet information processing unit which derives the switching control information therefrom.

4. A packet and circuit switching system according to claim 3, characterized in that:
data bus input and output means comprises parallel data busses,
the control bus input and output means comprises serial links,
and each user interface module comprises a switch bus interface means which comprises:
means for sending the packet or circuit information from the packet or circuit information processing units during each burst time B(j+p), on the data bus input means and provide the information received from the switching system to the packet or circuit information processing unit and
multiplexing means for multiplexing the input control information from the packet and circuit information processing units and providing this information in series on the serial link of the control bus input means,
receiving means in the circuit and packet information processing units for receiving the output control information.

5. A circuit and packet switching system according to any one of claims 1 to 4 characterized in that:
the circuit processing unit in the user interface module is attached to a plurality of circuit users and comprises means for sending connection and disconnection control packets in order to set up or release the circuit type connections between circuits users attached to the same or different user interface modules.

6. A circuit and packet switching system according to claim 5, characterized in that:
said system comprises circuit switching control means responsive to the connection and disconnection request packets received from the user interface modules for managing the circuit type connections between users by allocating at least one slot td in a selected burst of periods T in the frames transmitted through the input and output bus connecting the user interface modules involved in the connection of the switching means, during the connection duration, under control of the connection and disconnection request packets.

7. A circuit and packet switching system according to claim 6, characterized in that:
the circuit switching control means send connection control packets to the modules involved in connections in response to the connection request packets received from the user interface modules, the connection control packets sent to the user interface modules involved in a connection comprising information identifying the allocated slot-td number(s) and the identification of the user attached to the module and the identification of the target module.

8. A packet and circuit switching system according to claim 7 characterized in that each circuit information processing means comprises:
circuit information transmitting means,
circuit information receiving means,
first storing means comprising as many storing positions as there are slots td in a period T, with each storing position corresponding to a slot-td number, the contents of said first storing means being updated in response to the connection and disconnection control packets received by the user interface module to store the identification of the user in the position of said first storing means identified by the allocated slot-td numbers and setting a flag bit to a value which indicates that the slot is allocated to a circuit connection, during the duration of the connection,
second storing means comprising a number of storing positions equal to the maximum number of circuit users attached to the module with at least one position for each said user in which the identicication of the target module and of the user is stored in the position assigned to the user, during the connections duration in response to the connection and disconnection control packets,
addressing means generating addresses for sequentially addressing the storing positions of the first storing means,
means responsive to the flag bits read from the storing positions of the first storing means corresponding to the slot-td numbers of a burst B(j+p) for sending a circuit request transfer at the end of the burst B(j−q), if at least one flag bit is found at a value indicative that a slot td of the burst B(j+p) is allocated to a circuit transfer,
gating means responsive to the information read from the addressed storing position of the first storing means to address the second storing means with the read user identification information if the flag bit indicates that the slot is allocated to a circuit connection,
accumulating means responsive to the identifications of the target modules, if any, corresponding to burst B(j+p) read from the second storing means to provide the target information on the control bus input means,
means responsive to the identifications of the users read from the second storing means to activate the receiving and transmitting means to provide the circuit user information on the data input bus means or receive the circuit user information from the data output bus means at the appropriate burst times in the periods T.

9. A packet and circuit switching system according to claim 8 characterized in that:
the circuit users are attached to the circuit information processing unit of the user interface modules through a serial link on which at least one said slot td is assigned to each user in a frame of period T, with the duration of the said slot tl being higher than the duration of said slot td, the identification of the user in the first storing means comprising the slot-tl number(s) assigned to the user on the serial link.

10. A packet and circuit switching system according to claim 9 characterized in that:
the second storing means comprises as many storing positions as there are slots tl in a period T.

11. A packet and circuit switching system according to claim 8 characterized in that:
a burst time can be allocated to several circuit exchanges controlled by distinct switching control information identifying distinct target modules.

* * * * *